United States Patent [19]

Schilling

[11] Patent Number: 4,762,488

[45] Date of Patent: Aug. 9, 1988

[54] PORTABLE GAS-FIRED FORCED-DRAFT HEATER

[76] Inventor: Thaddeus A. Schilling, 549 Shoshone St., Lander, Wyo. 82520

[21] Appl. No.: 10,009

[22] Filed: Feb. 2, 1987

Related U.S. Application Data

[63] Continuation-in-part of Ser. No. 735,993, May 20, 1985, Pat. No. 4,640,680.

[51] Int. Cl.[4] ............................................. F23D 14/46
[52] U.S. Cl. .................................... 431/350; 431/353
[58] Field of Search ............... 431/8, 116, 170, 171, 431/172, 187, 344, 347, 348, 350, 353, 354, 355, 203; 432/222, 223; 110/260

[56] References Cited

U.S. PATENT DOCUMENTS

| | | | |
|---|---|---|---|
| 2,220,603 | 11/1940 | Hirtz et al. | 431/171 |
| 2,440,491 | 4/1948 | Schwander | 431/171 |
| 2,518,364 | 8/1950 | Owen | 431/165 |
| 2,581,316 | 1/1952 | Wolfersperger | 431/8 |
| 3,223,141 | 12/1965 | Safford | 431/171 |
| 4,062,343 | 12/1977 | Spielman | 431/353 |
| 4,063,876 | 12/1977 | Schweiss | 431/344 |

Primary Examiner—Samuel Scott
Assistant Examiner—Noah Kamen
Attorney, Agent, or Firm—Christie, Parker & Hale

[57] ABSTRACT

A portable gas-fired forced-draft heater has a burner assembly mounted in a tube coupled to the intake port of a motor-driven blower. The burner operates in a stream of high velocity air which flows past the burner to the blower. The burner includes shrouds which cooperate with a fuel and air mixing nozzle to enable fuel to be burned efficiently and reliably over a wide range of fuel flow rates to the burner. A flame stabilization surface is spaced appropriately from the nozzle to enable reliable ignition of the fuel-air mixture. A controlled portion of the warm gases passing through the blower is routed to a receptacle for a fuel container to maintain pressure in the container as the preferably liquified gas fuel is consumed during operation of the heater.

7 Claims, 5 Drawing Sheets

PORTABLE GAS-FIRED FORCED-DRAFT HEATER

CROSS-REFERENCE TO RELATED APPLICATIONS

This is a continuation-in-part of application Ser. No. 735,993 filed May 20, 1985, now U.S. Pat. No. 34,640,680.

FIELD OF THE INVENTION

This invention pertains to gas-fueled heaters. More particularly, it pertains to a portable gas-fired forced-draft heater which can be operated on a variety of fuels.

BACKGROUND OF THE INVENTION

The Need Addressed by the Invention

In locations where winters are severe and extreme cold is encountered, internal combustion engines, as in automobiles, light aircraft, and other vehicles, become sufficiently cold (unless they are garaged in heated spaces) that they are very difficult, often impossible to start. Starting problems arise when engines become so cold that their lubrication oil becomes sufficiently viscous that cranking of the engine does not cause starting within the capacity of the battery. Engine starting is made possible by heating the engine sufficiently to reduce oil viscosity enough to enable cranking to be achieved.

Emergency vehicles, such as ambulances, fire engines, and the like, cannot be allowed to become unstartable due to engine coldness. Such vehicles often are garaged in heated structures, and so starting problems due to coldness are minimized at the base stations of such vehicles. However, situations arise where such emergency vehicles are away from their base stations, and so can become sufficiently cold they become hard to start.

As another example, many light aircraft are not parked in heated hangars. Rather, they are parked in the open. In cold weather, they experience the same engine starting difficulties as do automobiles and the like. Such difficulties are easily overcome by pre-heating the engines.

Automobiles and light aircraft use electrically powered starting mechanisms. Electric power is provided by storage batteries which are useful to provide power for functions other than operation of the vehicle or aircraft in which the batteries are located.

It is seen, therefore, that a need exists for a portable device which is sufficiently compact and lightweight that it can be carried or stored in an automobile, ambulance or light plane, for example, and which can be used safely and conveniently to heat a cold vehicle engine to enable engine starting. The device should provide large quantities of heat at low cost, and should operate on fuels which are readily obtainable and safely transportable. Such a device can be used to advantage to serve other purposes under other circumstances if desired.

SUMMARY OF THE INVENTION

This invention provides a simple, effective, efficient and reliable portable forced-draft, gas-fueled heater. The heater can be embodied in a variety of configurations and sizes including a presently preferred configuration in which the heater is sufficiently compact to be readily transportable in either the luggage or passenger compartment of an automobile or in a light aircraft. The heater preferably uses packaged, i.e., bottled gaseous fuel which is readily available and is easily and safely transportable. The heater can have electrical requirements adapting it to be operated on power available from an automotive, aircraft or snowmobile ignition system or a separately carried battery. The heater provides efficient combustion of the pertinent fuel to create a high volume of hot, but not overly hot air which is conveniently and safely usable for heating a cold internal combustion engine sufficiently that the engine can be started conveniently by the starting and cranking system with which the engine typically is equipped. The heater has diverse other uses. Thus, a heater according to this invention advantageously addresses and fills the need identified above.

Generally speaking, one aspect of this invention provides a portable, fluid-fueled heater which comprises a blower having an intake port and a discharge port, together with means for powering the blower. A burner assembly for the heater includes an elongate tubular housing having an open discharge end connected to the blower intake port and an opposite open air inlet end. A fuel-air nozzle assembly is mounted in the housing substantially coaxially of the housing adjacent the air inlet end for discharging a mixture of fuel and air toward the housing discharge end. Flame stabilization means are cooperatively associated with the nozzle assembly for defining in the housing, substantially along its axis between the nozzle assembly and the blower inlet port during operation of the blower, a region of relatively high pressure fuel-air mixture surrounded by a relatively low pressure region of air flow induced by blower operation. Igniter means for the burner assembly are selectively operable for igniting fuel in the relatively high pressure region. The heater also includes means for controllably coupling the nozzle assembly to a source of fuel at superatmospheric pressure. Propane is a presently preferred fuel for the heater.

Another aspect of this invention provides a portable forced-draft heater which includes a burner assembly which is operable for mixing a gaseous fuel with air and for discharging a fuel-air mixture therefrom to a combustion zone. An air blower has a housing defining inlet and outlet ports respectively to and from the interior of the housing. A motor is coupled to the blower for operating the blower to draw air into the inlet port and to discharge air from the outlet port. Burner support means mount the burner assembly to the blower for flow of air past the burner assembly and the combustion zone in response to operation of the blower. The heater includes means for connecting the burner assembly to a source of pressurized gaseous fuel for supply of fuel from the source to the burner assembly. Means are provided for directing to the fuel source a selected fractional portion of the heat created by burning of fuel in the combustion zone for maintaining pressure in the source during fuel consuming operation of the heater.

Still another aspect of this invention provides a burner for burning a fuel-air mixture in which the quantity of fuel supplied per unit of time is adjustable. The burner is adaptable for use within a surrounding annular high velocity airstream in which the burner is substantially coaxially positioned. The burner comprises a fuel and air mixer and nozzle assembly for mixing fuel supplied to the assembly with air, and for discharging that mixture along an axis of the assembly to a principal flame zone. The assembly is adapted for connection to a source of fuel for supply of fuel from the source to the assembly. The assembly has a discharge end on the above-mentioned axis in association with an upstream limit of the principal flame zone. Spaced upstream and downstream combustion zone shroud means are disposed along the axis in association with the mixer and nozzle assembly, and with a location downstream of the assembly, for creating around the principal flame zone, during the existence of the high velocity airstream therepast, an annular region of relatively nonturbulent intermediate pressure air in which combustion of the fuel-air mixture can occur. The shroud means includes plate means disposed substantially normal to the axis upstream and downstream of the discharge end of the mixer and nozzle assembly.

In yet another aspect of the invention, a burner is provided for burning a fuel-air mixture is which the quantity of fuel supplied per unit of time is adjustable. The burner is adapted for use within a surrounding annular high velocity airstream in which the burner is substantially coaxially positioned. The burner includes a fuel and air mixer and nozzle assembly for mixing fuel supplied to the assembly with air and for discharging that mixture along an axis of the assembly to a principal flame zone. The assembly is adapted for connection to a source of fuel and has a discharge end on the axis in association with an upstream limit of the principal flame zone. A heat resistant surface is disposed on and substantially normal to the axis a selected distance downstream from the discharge end of the mixer and nozzle assembly. The surface has an area which is determined in cooperation with the selected distance to be effective to enhance and enable ignition of fuel-air mixture discharged from the discharge end of the mixer and nozzle assembly.

DESCRIPTION OF THE DRAWINGS

The above-mentioned and other features of this invention are more fully set forth in the following detailed description of a presently preferred embodiment of the invention, which description is presented with reference to the accompanying drawings wherein.

DESCRIPTION OF THE ILLUSTRATED EMBODIMENT

Figure 1:
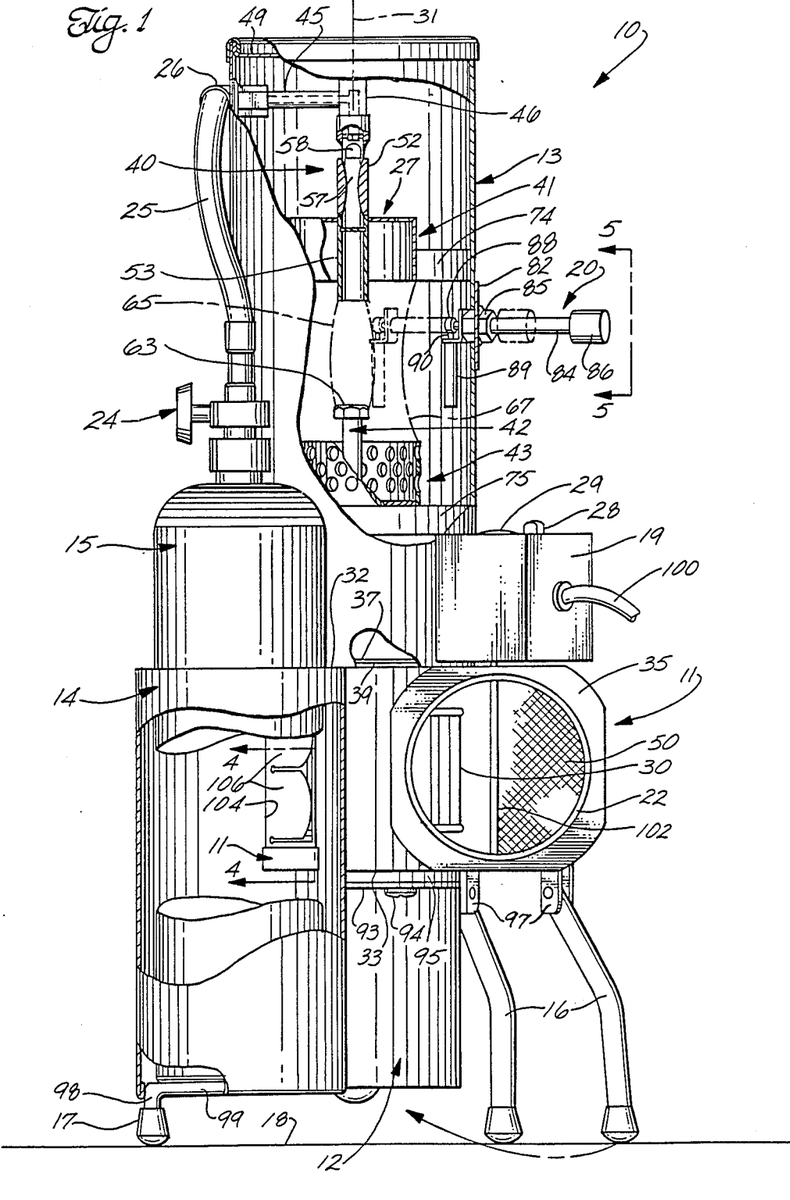
FIG. 1 is an elevation view, with parts broken away, of a presently-preferred portable forced-draft gas-fired heater according to this invention.
Figure 2:
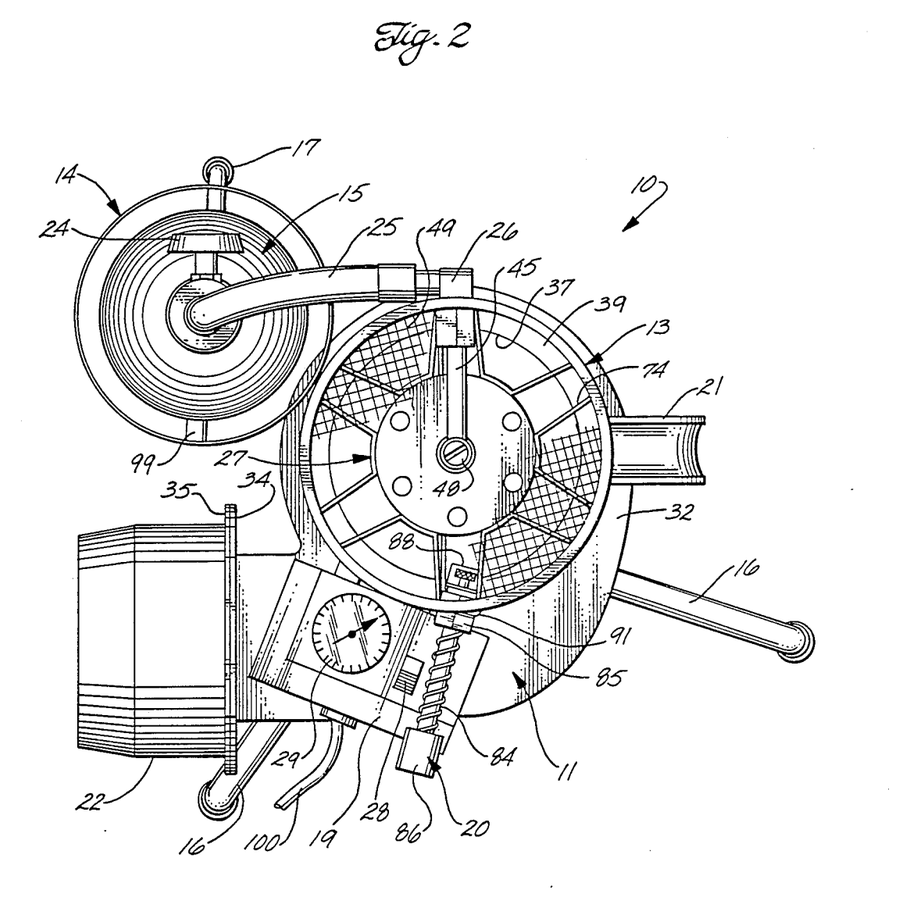
FIG. 2 is a top plan view of the heater shown in FIG. 1.
Figure 3:
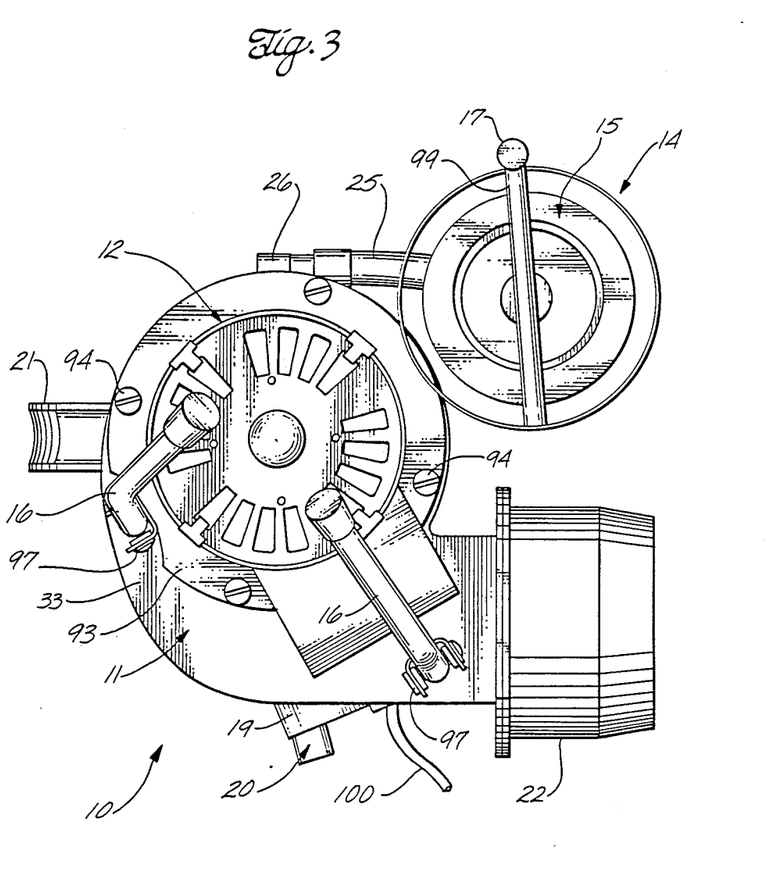
FIG. 3 is a bottom plan view of the heater shown in FIG. 1.

FIGS. 1, 2 and 3 are, respectively, side elevation, top plan and bottom plan views of a presently preferred heater 10 according to this invention. The principal elements of the heater are a blower 11, a motor 12 for powering the blower, a burner support tube 13, and a heat cuff and holster tube 14 for receiving a suitably sized container 15 of pressurized fuel, preferably propane. Fuel container 15 preferably is a 14 to 16 ounce bottle of propane fuel in which the propane is present principally in liquid form at approximately 100 lbs/sq.in. pressure at room temperature. Other major features of heater 10, as shown in FIGS. 1-3, are two retractible legs 16 and a fixed leg 17 for supporting the heater on a surface 18, a power switch and thermometer housing 19, and an igniter assembly 20 which is mounted to the burner support tube intermediate its length to be accessible from the exterior of the tube. A carrying handle 21 is secured to the exterior of the burner support tube. A fitting 22 for receiving flexible ducting is carried by blower 11 to define a hot air outlet port from the heater. A fuel shut-off, flow regulating and pressure regulating valve assembly 24 is connected to the outlet nipple of fuel bottle 15, and to a flexible gas hose 25 which is in turn connected to a connection fitting 26 associated with a burner assembly 27 disposed within support tube 13. Housing 19 provides support and enclosure for a motor ON/OFF switch 28 and for a dial-indicating thermometer 29 so mounted that its dial is visible at the top of housing 19 (see FIG. 2).

Blower 11 preferably is of the squirrel cage type in which a squirrel cage impeller 30 is mounted for rotation about an axis 31 extending vertically of the heater coaxially of burner support tube 13. The blower has a housing which has substantially parallel upper and lower surfaces 32 and 33 and sidewalls which define a scroll enclosure for the impeller. The blower housing has an air discharge port defined through a peripheral flange 34 to which flexible duct connection fitting 22 is connected via its own flange 35. The end of fitting 22 opposite from flange 35 is tapered to facilitate insertion of a suitably sized length of flexible duct onto the fitting for a force-fit frictional connection. An air inlet port 37 to the blower housing is defined in housing upper surface 32 and is centered on heater axis 31.

Burner support tube 13, which has its central axis disposed collinearly of heater axis 31, has its open lower end secured, as by welding, to the blower housing top wall 32. Blower air inlet opening 37 is actually defined by an annulus plate 39 which is connected to the blower housing top wall inside burner support tube 13 and which slopes inwardly and downwardly from the inner walls of the burner support tube to the periphery of the blower inlet opening. The configuration of the annulus plate prevents cross-circulation of high pressure air into the low pressure region inside the blower housing during operation of the heater.

Figure 9:
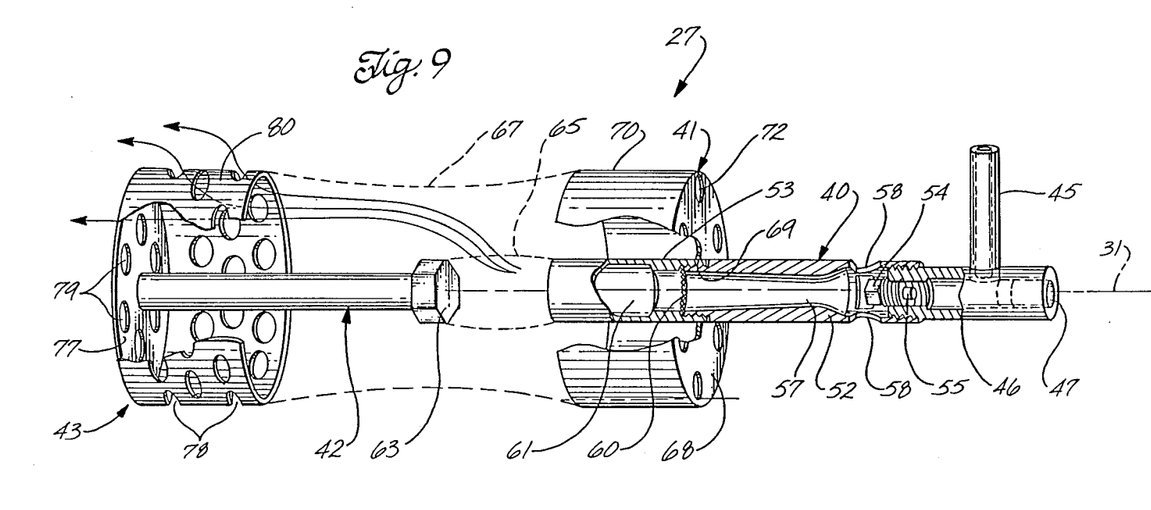
FIG. 9 is a fragmentary perspective view of the burner assembly of the heater shown in FIG. 1.

As shown in FIGS. 1 and 9, proceeding downwardly of the heater along axis 31, the burner assembly includes a fuel-air mixer and nozzle assembly 40, a baffle cup assembly 41, a flame pedestal 42, and a flame cup assembly 43. The baffle cup and flame cup assemblies provide coaxial support of the burner assembly within support tube 13; further support of the burner assembly within the heater is provided by a fuel flow tube 45 which defines a fuel flow passage from fitting 26 to an orifice holder 46 disposed along axis 31 and having an axial internal bore which communicates to flow tube 45. The upper end of the orifice holder is axially tapped, as at 47, to receive a screw 48 (see FIG. 2) which passes through and holds the center of a wire mesh screen disc 49 disposed across the interior of burner support tube 13 across its open upper end. Screen 49 does not restrict the flow of air into the heater during its operation, but does prevent foreign objects from moving into the heater where they can pass downwardly past the burner assembly and into the blower where such objects may cause damage to impeller 30; a similar protective screen 50 is held in place across the blower discharge port between flanges 34 and 35 to prevent entry of foreign objects through the discharge port and the heater hot air outlet. The lower end of orifice holer 46 is threaded into the upper end of a nozzle tube 52 which has its lower end threaded into the upper end of a mixing chamber sleeve 53. An axially bored orifice plug 54 is threaded into the inner diameter of the orifice holder at the lower end of the holder. The lower end of the orifice plug bore is sized to define an orifice of the desired area. A fuel filter 55 cooperates with the orifice plug bore at its upper end within the orifice holder. The fuel filter may be defined in any suitable way, as by a body of porous sintered brass.

The interior of nozzle tube 52 is configured to form a venturi nozzle 57. A plurality of air inlet openings 58 are formed through the nozzle tube slightly downstream of the lower end of orifice 54 plug above the upper end of the entrance to the venturi. Since the fuel, preferably propane gas, is supplied at high pressure, preferably regulated at valve assembly 24 to about 50 psig, to the orifice plug, the high pressure stream of propane issuing from the orifice into the venturi throat induces a flow of air into the venturi through openings 58, thus creating a mixture of fuel gas and air.

A spark arrester screen 60 is held in place in the interface between nozzle tube 52 and mixing chamber sleeve 53 above an enlarged diameter portion of the sleeve which is open to the lower end of that sleeve and which defines a mixing chamber 61 where the fuel-air mixture received from the venturi is more thoroughly mixed and discharged along axis 31.

In the presently preferred heater illustrated in the drawings, the inner diameter of burner support tube 13 is 4 inches. The blower and its preferably constant speed drive motor are cooperatively related so that during operation of the blower, the blower is rated at 148 cubic feet per minute. It is apparent, therefore, that when the blower is operated, substantial quantities of air are drawn into the open upper end of burner support tube 13 to move downwardly through that tube past the burner assembly and to the inlet to the blower. The burner, therefore, operates in a high velocity stream of air which surrounds the burner and which moves in the same direction as the direction in which the fuel-air mixture is discharged from mixer and nozzle assembly 40. Because this air is moving at high velocity, it has low pressure. The presence of the high velocity, low pressure turbulent annular airstream around the high pressure, low velocity fuel-air mixture emanating from mixing chamber 61 is inherently hostile to ignition and stable burning of the fuel-air mixture within the burner support tube. Flame pedestal 42 is provided downstream of mixing chamber 61 along burner axis 31 to enable ready ignition of the fuel-air mixture at a wide range of fuel supply rates to the heater. Baffle cup 41 and flame cup 43 serve, among other purposes, to enable the ignited fuel-air mixture to burn in a stable and complete manner within the turbulent airstream rushing past them.

Flame pedestal 42 defines, at its upper end, a flame resistant surface 63 which is normal to and centered on burner axis 31. The area of surface 63 and the extent of its spacing downstream from the outlet from mixing chamber 61 are cooperatively related to enable an enhanced ignition of the fuel-air mixture discharged from the mixing chamber. Surface 63 is so sized and positioned that it effectively provides a back-pressure for the fuel-air mixture, thereby causing the fuel-air mixture to be concentrated in a stably-defined high pressure region 65 between the pedestal and the nozzle along axis 31 throughout a wide range of fluid flow rates to, through and from mixer and nozzle assembly 40. The assured presence of a stable zone in which fuel-air mixture exists within the heater enables reliable ignition of the heater by suitable means such as igniter assembly 20.

In the presently preferred heater shown in the drawings, the diameter of the mixing chamber at its lower end is 13/32 inch. Flame pedestal 42 conveniently is defined by a Grade 5, 5/16 inch bolt having a ½ inch hexagonal head. It is therefore apparent that the area of surface 63 is approximately equal to the outlet area from mixing chamber 61. The spacing between surface 63 and the lower end of the mixing chamber in the presently preferred heater has been found to be variable through any distance desired up to about 1-1/16 inches, preferably ⅜ inch, but not appreciably more than about 1-1/16 inches. It has been found empirically that this area and spacing of surface 63 relative to the downstream end of mixing chamber 61 in the presently preferred heater provides a stable and persistent high pressure gas/air mixture zone throughout a wide range of the fuel flow rates through the orifice within the mixer and nozzle assembly. It has been found that when these relationships are maintained, ignition of the fuel-air mixture within the heater can be obtained effectively and quite reliably.

In heater 10, low velocity, high pressure fuel-air zone 65 exists centrally of a region 67 of relatively stable nonturbulent intermediate-pressure air which itself exists coaxially of the low pressure, high velocity, turbulent airstream which flows along the walls of tube 13. For lack of a better term, zone 67 is referred to as an "air bottle". The air bottle is created by the cooperation of baffle cup 41 and flame cup 43 which coact to shroud zone 67 from the effects of the turbulent flow of air induced by operation of the blower. The purpose of the air bottle is to provide stable and complete combustion of the fuel without the use of structure which interferes with ignition of the fuel. Essentially all combustion of the fuel-air mixture occurs in the combination of high pressure region 65 and air bottle 67, with the result that, during operation of the heater, while the temperature of the flame in the air bottle can be as high as 1800° F., perhaps higher, the walls of tube 13 remain sufficiently cool as to be safely touched by the unprotected human hand, and the temperature of the gases entering blower 11 is not sufficiently high to cause degradation of the lubricant used in the bearings for the blower and its drive motor, thereby assuring that the blower can be operated reliably over a long period. The air bottle enables the heater to be operated efficiently over a wide range of fuel rates, from a high fuel rate producing approximately 45,000 BTU/hr. (not recommended) to a very low fuel rate in which the flame size visible at the outlet of mixing chamber 61 is about the size of a match head.

Figure 8:
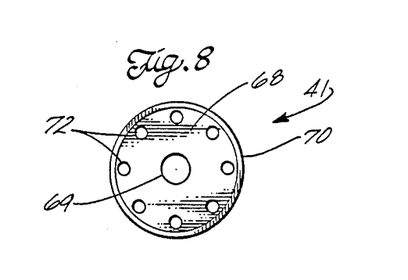
FIG. 8 is a top plan view of the baffle cup in the burner assembly of the heater shown in FIG. 1.

Baffle cup 41, as shown in FIG. 1 and 9 (see also FIG. 8), preferably is provided as a downwardly open, circularly cylindrical cup disposed concentrically about axis 31. The cup has a flat upper end defined by a disc 68 having a central aperture 69 of such diameter as to have slight clearance with the outer walls of mixer and nozzle assembly 40 which passes downwardly through the disc. The cylindrical wall 70 of the baffle cup extends downwardly from disc 68 parallel to the inner wall of tube 13 to its lower end which, as seen best in FIG. 1, is located somewhat upstream of the lower end of mixing chamber sleeve 53. The clearance afforded by the difference in diameter of opening 69 and the outer diameter of mixer and nozzle assembly is as small as possible, preferably about 0.005 inch, to prevent the high velocity, low pressure air flowing into the upper end of tube 13 from blowing along the exterior of the mixer and nozzle assembly to the vicinity of the outlet of mixing chamber 61. The presence of low pressure, high velocity air in the vicinity of high-pressure zone 65 makes ignition of the fuel-air mixture and the maintenance of a stable flame following ignition, quite uncertain; it can also dilute the fuel-air mixture to make complete combustion difficult or impossible to achieve.

A plurality of holes 72 are formed through baffle cup disc 68. In the presently preferred heater noted above, there are eight 3/16 inch diameter holes 72 defined through the disc-like base of baffle cup 41. These holes are formed as close to the edge of the cup as possible.

The effect of baffle cup 41 in burner assembly 27 is to provide an area of wind shadow around high pressure fuel-air region 65 which is important to the creation of air bottle 67. That is, the baffle cup creates below it, concentric to axis 31, an area in which some of the air inside tube 13 is shadowed from the effect of the high velocity, low pressure, turbulent air flow stream induced in the tube by operation of blower 11. The presence of holes 72 in the baffle cup is not inconsistent with this effect. Rather, these holes enable the creation in baffle cup 41 of a small annulus of air moving along the inner walls of the baffle cup at a velocity which is a desirable amount less than that of the airstream flowing along the outer walls of the cup; this velocity difference enables the definition and maintenance of the desired air bottle. The airstream constituted by air flowing through holes 72 prevents a vacuum from forming within the baffle cup. If such a vacuum existed, it would reintroduce into the area immediately below the skirt of the baffle cup precisely the turbulence which the cup is present to prevent, and such turbulence would cause the burner flame, especially at low fuel flow rates, to burn upwardly, i.e., back toward the flat plate of the baffle cup, thereby making both the baffle cup and the axial portion of the burner assembly dangerously hot.

Baffle cup 41 is supported around mixer and nozzle assembly 40 by a spider 74 which is secured, as by rivets, both to the walls of the cup and to the burner support tube. The spider is configured to provide minimum resistance to the flow of air past it.

The baffle cup is approximately 2 inches in diameter, and the cup walls 70 have a dimension of 1 inch along the axis of the burner assembly in the presently preferred heater.

Flame cup 43 has approximately the same dimensions as the baffle cup and is mounted in the burner support tube on the bracket 75 which also provides support for flame pedestal 42. The flame pedestal passes to the bracket through a central opening in the center of a flat bottom 77 of the circularly cylindrical flame cup. The bottom and wall 80 of the flame cup are heavily perforated to enable combustion products from the heater combustion zone (the combination of zone 65 and air bottle 67) to pass with minimum backpressure through the flame cup and on to the inlet to blower 11. In the presently preferred heater, there are 36 holes 78 in the flame cup walls and six holes 79 through the flame cup bottom; all holes are ¼ inch in diameter and those in the flame cup bottom are centered on a 1 inch diameter circle concentric to burner axis 31. Holes 78 can be replaced by slots if desired. The presence of relatively fewer holes in flame cup bottom 77 than in wall 80 causes the principal flow of combustion gases to be through the walls of the flame cup rather than through its bottom, thereby protecting the blower, located 3⅜ inches below the flame cup, from excessive heat. The function of the flame cup is to create significant turbulence and a relative vacuum immediately below the cup so that the superheated gases from within the air bottle thoroughly mix with high velocity, low pressure ambient air drawn past the air bottle before they enter the blower. The objective is to keep the temperature of the blower at sufficiently low level to preserve the motor armature and its bearings.

The holes 78 formed through the walls of the flame cup serve several purposes. They are sufficiently small that individual jets of flame which may be associated with each hole are relatively short. This allows the products of such flames to be diluted and cooled by the passing unheated airstream moving along the walls of tube 13 before those flame jets can meaningfully heat the walls of tube 13. As a result, tube 13 stays relatively cold during operation of the heater. Further, there are as many of holes 78 in the flame cup walls as possible, considering the structural integrity of the wall, to prevent significant back-pressure from causing a reverse flow of burning gas upwardly in the flame cup over the top of the flame cup wall. Excessive-back pressure in this region ruins the shape of the air bottle and thus dilutes the fuel-air mixture existing along the axis of the burner before it has had an opportunity to burn completely. Undesired back-pressure and reverse air flow within the flame cup also introduces turbulence within the air bottle, making the flame unstable. It has been found that if the perforations in the flame cup wall are not adequate, it is possible for the flame to blow out when flow control valve 24 is operated to suddenly change the size of the flame within the burner.

It has been found that if flame cup walls 80 are eliminated, the desired objectives of maintaining tube 13 safe to the touch and preventing excessive temperatures in blower impeller 30 are achieved. Tube 13 remains cool because the flame tends to burn more parallel to burner axis 31. Impeller temperatures are within reasonable limits because of the existence of plate 77. However, the elimination of the flame cup walls effectively destroys the existence of the air bottle and causes the air bottle to shrink to a conical configuration ending approximately 1 inch below the lower end of mixing chamber 61. The result is that combustion efficiency in the heater is reduced from 100 percent to about 50 percent without change in the rate of fuel introduction to the burner assembly. The flame cup walls are one inch high in the presently preferred heater.

Figures 5, 7:
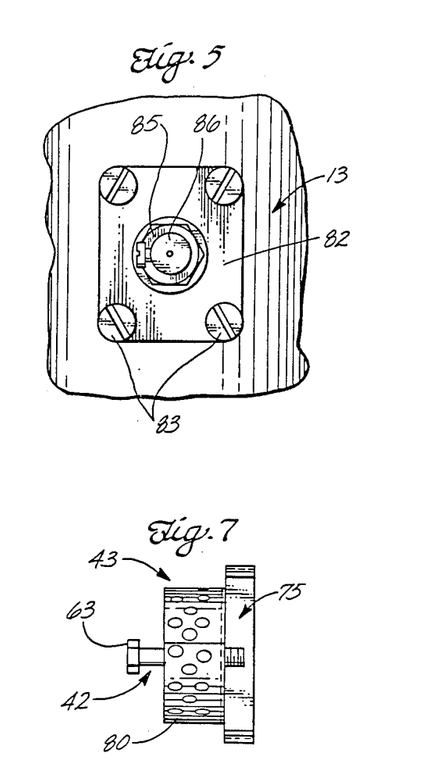
FIG. 5 is an enlarged fragmentary elevation view taken along line 5—5 of FIG. 1.
FIG. 7 is a side elevation view taken along line 7—7 in FIG. 6.
Figure 6:
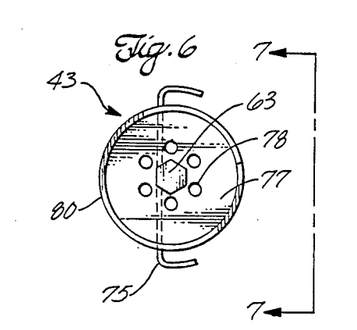
FIG. 6 is a top plan view of the flame cup and flame pedestal which forms a component of the burner assembly of the heater.

The igniter 20 which is used in the presently preferred heater according to this invention is a commercially- available gas lantern igniter manufactured and marketed widely by Coughlin Company for use in Coleman lanterns. The igniter is mounted in a door 82 (FIGS. 1, 2 and 5) which closes an opening in burner support tube 13 adjacent the lower end of mixer and nozzle assembly 40. The door is removably secured to the burner support tube by a plurality of sheet metal screws 83 (see FIG. 5). The igniter includes an actuator shaft 84 which is slidably and rotatably supported in a mounting assembly 85 which cooperates with the inner and outer surfaces of the door. A knob 86 is connected to the outer end of the actuator shaft. A bias spring 87 is engaged between the inner end of knob 86 and the outer part of mounting assembly 85 to urge the actuator shaft outwardly of the burner support tube while yet affording axial and rotational movement of the shaft when desired. A sparker wheel 88 is connected to the inner end of shaft 84 inside tube 13 in association with a flint carrier sleeve 89 which contains a spring which urges a flint 90 (FIG. 1) into engagement with the periphery of the striker wheel. Igniter mounting assembly 85 cooperates with a boss 91 (FIG. 2) which is so formed in door 82 that the axis of the igniter actuator shaft is skewed to burner axis 31.

To ignite the fuel-air mixture discharged from mixing chamber 61 when heater 10 is put into operation, the user of the heater grasps knob 86 and pushes it to cause the actuator shaft to move axially against the bias of spring 87 into burner support tube 13 sufficiently to cause striker wheel 88 and flint 90 to be positioned to the side of burner axis 31 a short distance below the lower end of the mixer and nozzle assembly; see the phantom lines in FIG. 1 which show the actuated position of the igniter assembly. With the striker wheel and flint so positioned, knob 20 is given a smart clockwise twist to cause cooperation of striker wheel 88 and flint 90 to create a shower of sparks which are thrown toward burner axis 31, thereby to ignite the fuel-air mixture present in flame zone 65. Because the inner end of the igniter is not positioned along the burner axis when the igniter is in its actuated position, the lower end of the flint carrier sleeve does not interfere with the upper end of flame pedestal 42. After ignition has been obtained, the igniter knob is released to allow the igniter to move to its retracted position shown in solid lines in FIG. 1. In its retracted position, the igniter is bathed in the annular stream of high velocity, low (ambient) temperature air which flows along the inner walls of tube 13 as the heater is operated. The igniter, thus, is not permanently positioned at a location where it can become hot during operation of the heater, thereby prolonging the life of the igniter.

It will be appreciated that flame igniters of any desired kind, such as piezoelectric igniters, can be used in heater 10, if desired. Whichever kind of igniter is used, it is preferred that its operative elements be mounted for movement toward and away from the axis of the burner so that, when the igniter is not in use, its operative elements can be positioned in the cool air stream flowing along the inner walls of the burner support tube, rather than remain within the combustion zone of the heater.

Blower motor 12 is mounted to a motor support plate 93 (FIGS. 1 and 3) which is secured to the bottom wall 33 of the blower housing to close an opening in that wall which is centered on heater axis 31 and which is of sufficient diameter to allow impeller 30 to be removed from the blower if desired. The motor support plate is removably connected to the bottom wall of the blower housing by screws 94. A resilient, thermally insulative gasket 95 is disposed between the upper end of the motor and the motor support plate. The gasket damps such vibrations as may occur from operation of the motor, insulates the motor from the temperature generated in the blower housing as the heater is operated, and provides a mechanism for the flow of cooling ambient air through the motor from its lower end into the interior of the blower as the heater is operated.

The two retractable support legs 16 for the heater are pivotally mounted at their upper ends to suitable brackets 97 which are connected to the bottom wall 33 of the blower housing, as shown in FIG. 3. The deployed positions of these legs is shown in FIGS. 1 and 2, whereas their retracted positions are shown in FIG. 3. Legs 16 are made retractable in order to provide stable support of the heater during its operation, and to render the heater sufficiently compact to be conveniently transportable when not in use. The third of the three points of operative support for the heater is provided by fixed support leg 17 which is defined by a downwardly-turned end portion 98 of a rod 99 which extends horizontally across the open lower end of the fuel bottle heat cuff and holster tube 14 (see FIGS. 1 and 3). Rod 99 functions as a support and stop for fuel bottle 15 to prevent the lower end of the bottle from passing through the otherwise open lower end of tube 14 and to cause the bottom of the bottle to be located above support surface 18 during use of the heater.

A suitable electric power supply cable 100 is connected to power switch and thermometer housing 19, as shown in FIGS. 1 and 2, to provide electric power to the heater. The nature of the electric power to be supplied to the heater is dependent upon the nature of motor 12. The motor can be either a 115 volt A.C. motor, preferably of about 1/25 horsepower. Alternatively, depending upon the usage to which the heater is to be put, a motor can be a 12 volt D.C. motor or a 24 volt D.C. motor. In those instances where the motor is an A.C. motor, the remote end of power cable 100 terminates in a male connector (not shown) cooperable with a standard household electrical outlet. Where the motor is a D.C. motor, the remote end of the power cable terminates in a connector (not shown) of the kind which may be inserted into the receptacle of an automobile cigaret lighter or the like, for example, or such other electric connector (e.g., battery clamps) as is consistent with the expected source of power for the heater during its use. Regardless of its nature, motor 12 preferably operates at about 3100 RPM. A variable speed motor can be used if desired, but is not required.

Heater 10 is quite simple to use. Retractible support legs 16 are placed in their deployed positions. as shown in FIGS. 1 and 2, to support the heater in an upright position in spaced relation to support surface 18. The connector at the remote end of power supply cable 100 is coupled to a suitable electrical power source. Power control switch 28 is operated to its ON position to initiate operation of the blower, thereby to induce ambient air to enter the open upper end of burner support tube 13 and to flow at high velocity downwardly in the tube past burner assembly 27 to the intake port of the blower. Fuel shutoff and flow cntrol valve 24 is operated to cause fuel gas to flow from fuel bottle 15 through hose 25 to the burner assembly, and so create the high pressure fuel-air zone 65 within the heater. Igniter 20 is then operated to ignite the fuel-air mixture within the heater; the igniter is thereafter retracted from its operative position in the manner described above. The operator of the heater then observes the temperature indicated on the dial of thermometer 29 which has a sensor probe 102

(see FIG. 1) disposed adjacent to the outlet opening from the blower across the hot gas stream discharged from the blower. Valve 24 is operated to adjust the rate of fuel flow to the burner assembly until the thermometer shows that the gases being discharged from the heater are at the desired temperature which preferably is 200° F. If desired, a length of flexible hose, if not previously installed, can then be connected to the heater via fitting 22 at the heater outlet, and the other end of the flexible duct can be placed where desired, as on the ground under the engine of an automobile which is too cold to be started. The blower is operated for the desired time and then shut off. Shutdown of the blower is produced by first closing fuel valve 24 and then operating power control switch 28 to its OFF position.

It is important that the holder for fuel bottle 15 be provided in the form of a tubular sleeve having open upper and lower ends. Obviously, it is required that the upper end of the bottle holder be open in order for the bottle to be insertable into and removable from the holder. It is desirable that the lower end of the holder be substantially open to enable air to flow downwardly out of the holder during operation of the heater. Such a flow of air downwardly in the bottle holder is intentionally created by the structure of the heater during its operation. The air in this flow is warm.

Figure 4:
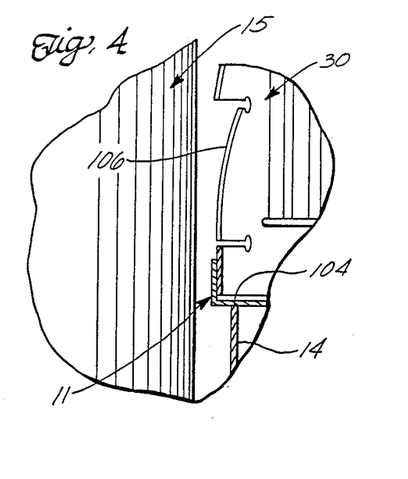
FIG. 4 is an enlarged fragmentary cross-section view taken along line 4—4 of FIG. 1.

The flow of warm gases around the exterior of the fuel bottle preferably is a spirally downward flow. The gases which are present in this flow are derived from the blower through an opening 104 (FIG. 1) formed through its side wall and through the wall of the bottle holster sleeve; see also FIG. 4. Holster sleeve 14 preferably is nested slightly over a portion of the blower housing by forming opening 104 in the holster wall so that a portion of the blower housing may extend slightly into the sleeve. A portion of the side walls of the blower housing in the holster sleeve are cut away to permit a selected amount of hot gases inside the blower to flow from the blower housing into the holster. The communicaton from the interior of the blower to the interior of the holster tube preferably is not a geometrically simple opening. Rather, such communication is afforded by a plurality of air deflection vanes 106 which preferably are defined by the manner in which the blower housing wall is cut away. The vanes are so contoured that they act upon the air moving therepast to cause the gases to spiral around and downwardly inside the holster tube around the lower exterior of the fuel bottle in which a suitable fuel is contained in principally liquid form at high pressure. The vanes are so configured and defined that they coact silently with the blower impeller, and do not produce a siren-like sound in cooperation with the impeller.

Propane boils at approximately −55° F. at atmospheric pressure. During operation of the heater, the rate of flow of gaseous phase propane from the bottle to the heater is sufficiently great that the pressure inside the bottle drops, thereby causing the liquid propane to boil and create more gaseous phase propane. However, as the propane boils, it must acquire its heat of vaporization from some location. If adiabatic conditions prevail, in which no heat is added to the propane from external locations, the heat of vaporization associated with boiling of the propane is extracted from the liquid propane itself, thus causing the liquid propane to become cold and causing the gas pressure in the propane bottle to fall even more. It has been found that, after approximately three minutes of normal usage of the heater, unless steps are taken to prevent it from occurring, the pressure inside fuel bottle 15 will drop from approximately 100 lbs.psi to a very low pressure insufficient to sustain operation of the heater. This reduction in pressure within the fuel bottle is the result of boiling of the liquid propane within the bottle under substantially adiabatic conditions. The presence of a controlled flow of hot gas around the lower portion of the fuel bottle during operation of the heater maintains the fuel bottle at sufficient temperature that boiling of fuel within the bottle does not cause the bottle to become cold and the gas pressure within the bottle is maintained as the heater is operated over extended periods. That is, as fuel in the bottle boils, it acquires its heat of vaporization from external locations rather than from within itself. The presence of the hot gas stream around the exterior of the fuel bottle enables the fuel to boil under substantially isothermal conditions rather than under substantially adiabatic conditions.

It was noted above that a heater according to this invention, notably heater 10, can be operated on a variety of fuels. If bottled gas is the fuel of interest, it can be propane, butane or Mapp gas, or any other commonly available gas including natural gas, propane being preferred. All bottled gases manifest the phenomenon of substantial loss of pressure when used at appreciable rates under adiabatic conditions. The feature of the hot gas bleed from blower 11 to fuel bottle sleeve 14 in heater 10 allows the heater to be used efficiently with any form of bottled fuel available.

The hot gas bleed feature described above with reference of FIGS. 1 and 4 is inherently self-regulating. When the heater is operated to produce a high-temperature discharge, a relatively high rate of fuel consumption will be necessary. High fuel rates correspond to high fuel boiling rates in the fuel bottle, thus tending to aggravate the problem of fuel pressure drop in the bottle during usage of fuel. However, if the blower discharge temperature is high, the temperature of the gas bled to the bottle holster will also be high, thus compensating for the tendency for fuel pressure to drop in the bottle. Conversely, when the heater is operated to produce lower discharge temperatures, a lower fuel rate exists, boiling rates are reduced, and lower quantities of heat are supplied to the fuel bottle to maintain bottle gas pressure.

The hot gas bleed feature of heater 10 is particularly valuable when relatively small fuel containers are used with the heater. Small containers contain small amounts of fuel in liquid form and have a relatively high ratio of container area to content volume. If desired, however, heater 10 can be used with large containers of bottled gas simply by disconnecting valve 24 and its associated hardware from bottle 15, by connecting a standard commercially available adaptor (such as Coleman Company part number 5410-790) to the valve assembly, and then by connecting the adapted valve assembly to a large fuel gas bottle with which the adaptor is useful. When fuel bottles of capacity substantially larger than about one pound are used with heater 10, the hot gas bleed feature is not needed to maintain fuel pressure as fuel is consumed . This is because a larger fuel bottle will contain sufficient quantities of fuel to enable fuel to boil in the container under substantially adiabatic conditions to enable the heater to be used over long periods before loss of fuel pressure becomes significant; if fuel pressure does drop somewhat, valve 24 can be opened to maintain the desired fuel flow rate to the heater.

In the event heater 10 is used with a fuel source other than a bottle 15 disposed in holder 14, then there should be no bottle in the holder. That is, heater 10 should not be used with a fuel bottle present in holder 14 and with fuel flow hose connected to some other source of fuel. If a fuel bottle is located in holder 14 and no fuel is being withdrawn from that bottle, the hot gases bled to the holder could heat the bottle sufficiently to cause the pressure in the bottle to increase to undesirable levels.

In view of the foregoing, it will be seen, that heater 10 includes means for directing to a source of fuel a selected fractional portion of the heat created by the burning of fuel in the heater for maintaining pressure in the source during fuel-consuming operation of the heater. It is within the scope of this invention that liquid fuel, such as "white gasoline", can be used to fuel the heater; in such an instance, the heater includes a suitable generator proximate the heater combustion zone for vaporizing and pressurizing the liquid fuel and its vapor.

Duct fitting 22, which defines the hot gas outlet opening of heater 10, preferably is configured to fit snugly into an end of a length of 3 inch flexible hose of the kind which is commonly used in connection with the vents of household clothes dryers. Such flexible hose has a spiral wire core and a flexible plastic sheath over that core, so as to be axially compressible; a substantial length of such a hose can be collapsed into a convenient package for storage. Such flexible hose is widely available commercially. When such a hose is used with a heater according to this invention, it is recommended that the hose be kept as straight as possible to aviod creating unnecessary back-pressures against which the heater blower must operate. Such back-pressures produce an increase in the heater gas exit temperature by indirectly reducing the ambient air flow rate through the heater. Excessively hot heater discharge gases can melt such hoses, especially at sharp bends in the hose where back-pressure are created.

The preferred operating position of heater 10 is the vertically upright position shown in FIG. 1. If desired, however, the heater can be operated in essentially any position. If the heater is operated in very cold circumstances, in which the initial pressure in fuel bottle 15 may be low, the discharge opening from the heater can be blocked or restricted for a short time, during which period a greater flow of warm gas will flow from the blower housing through opening 104 to the fuel bottle holder thereby to more rapidly warm the bottle and create therein a high gas pressure.

It is possible to construct heater 10 predominantly from commercially available parts and components, or from modifications of available parts and components. The principal newly fabricated components of the heater are the burner support tube, the fuel bottle holder sleeve, the baffle cup, the baffle cup spider, and the retractible leg mounting brackets, all of which can be made from 28 gauge cold rolled steel which can be galvanized, and the fixed and retractible heater legs and their supports. The flame cup and its support bracket can be made of 16 gauge cold rolled steel. Mixer and nozzle assembly 40 of heater 10 can be made by modifying components of a Bernzomatic Pencil-Tip Propane Torch Kit (Bernzomatic Corporation part no. JT681), by using an anterior portion of the kit's brass tubing (after plugging, drilling and tapping the same) to define orifice holder 46, by enlarging the orifice in that kit's orifice plug (Bernzomatic Corporation part no. JT684-c) to 0.024 inch, by remachining the venturi nozzle of that kit to have enlarged air inlet holes 58 ($\frac{1}{4}$ inch diameter squared at their lower ends as shown in FIG. 9) and to have a different venturi geometry better useful with heater 10's higher fuel flow rates, and by enlarging mixing chamber 61 to 13/32 inch diameter. That torch kit's control valve, and related hardware, can be used as valve 24 of heater 10 with modification of the pressure regulator to provide gas at enough pressure (about 50 psig) to the burner assembly. Fuel flow tubing 45 can be defined by a length of $\frac{1}{4}$ inch O.D. steel automotive brake line tubing brazed, e.g., to orifice holder 46. A 5/16 inch Grade 5 bolt, due to its hardness, provides an effective flame pedestal. Blower 11 can be Grainger catalog no. 4C446 squirrel cage blower and motor assembly; the motor in that assembly is a Dayton Electric Mfg. Co. no. 7021-3469 3160 RPM 125 horsepower 115 VAC motor. The igniter can be a Coughlan Company gas lantern igniter. The thermometer can be a Cooper part no. 1236-32 dial thermometer.

Workers skilled in the art to which this invention pertains will appreciate readily that a heater according to this invention can be embodied in devices of various size or configuration, and that the details of construction of a heater of this invention can be varied, modified, or altered without departing from the scope of the invention. They will appreciate that the foregoing description is that of a presently preferred embodiment of the invention, and is not to be interpreted as setting forth the only structural arrangement in which the invention can be embodied. Accordingly, the foregoing description is illustrative, rather than limiting, of the invention and the following claims are to be so construed.

I claim:

1. Combustion apparatus for burning a gaseous fuel-air mixture and adapted for use within a surrounding high velocity air stream, the apparatus comprising:
   (a) a fuel and air mixing nozzle assembly for mixing fuel supplied to the assembly with air, for creating an essentially entirely gaseous mixture of fuel and air, and for discharging that mixture along a discharge axis of the assembly to a combustion zone downstream of the nozzle assembly and surrounded by the air stream, the assembly being adapted for connection to a source of fuel for supply of fuel from the source under pressure to the assembly, the assembly having a discharge end on said axis through which the mixture is discharged to the combustion zone, and
   (b) spaced upstream and downstream combustion zone shroud means for creating in the combustion zone, during the existence of said air stream therepast, a region of relatively nonturbulent gas having a pressure higher than the pressure in said air stream and in which combustion of the fuel air mixture can occur, the shroud means being disposed along said axis respectively (1) upstream of and adjacent the nozzle assembly discharge end and (2) substantially at a downstream end of the combustion zone and including plate means disposed substantially normal to the axis upstream and downstream of the discharge end of the nozzle assembly,
   (c) the apparatus being characterized by the absence, between the upstream and downstream shroud means, of physical structure between the high velocity air stream and the combustion zone and the region of relatively nonturbulent gas therein.

2. Apparatus according to claim 1 wherein the downstream shroud means defines openings therethrough for controlled passage of gas therethrough from said relatively nonturbulent higher pressure region.

3. Apparatus according to claim 2 wherein the upstream shroud means defines openings therethrough for controlled passage of air therethrough.

4. Apparatus according to claim 3 wherein the aggregate area of the openings in the downstream shroud means is greater than that of the openings in the upstream shroud means.

5. Apparatus according to claim 3 wherein the upstream shroud means comprises a substantially circular plate disposed substantially normal to said axis upstream of the discharge end of the nozzle assembly and a wall member secured to the rim of the plate about the periphery of the plate and extending a selected distance in a downstream direction from the plate substantially parallel to the axis, and the openings in the upstream shroud means are defined in the plate proximate the periphery thereof.

6. Apparatus according to claim 5 wherein said selected distance is at least about substantially one-half the diameter of the plate.

7. Combustion apparatus for burning a gaseous fuel-air mixture and adapted for use within a surrounding high velocity air stream, the apparatus comprising:

(a) a fuel and air mixing nozzle assembly for mixing air with a fluid fuel supplied to the assembly at a rate within a substantial range of fuel flow rates, for creating an essentially entirely gaseous mixture of fuel and air having substantially a selected ratio of fuel to air, and for discharging that mixture along a discharge axis of the assembly to a combustion zone downstream of the nozzle assembly and surrounded by the air stream, the assembly being adapted for connection to a source of fluid fuel for supply of fuel from the source to the assembly at a fuel flow rate within the substantial range of fuel flow rates, the assembly having a discharge end of said axis through which the mixture is discharged to the combustion zone, and (b) spaced upstream and downstream combustion zone shroud means for creating in the combustion zone over said range of fuel flow rates, during the existence of said air stream therepast, a region of relatively nonturbulent gas having a pressure higher than the pressure in said air stream and in which combustion of the fuel-air mixutre can occur, the shroud means being disposed along said axis respectively (1) upstream of and adjacent the nozzle assembly discharge end and (2) substantially at a downstream end of the combustion zone and disposed substantially normal to the axis upstream and downstream of the discharge end of the nozzle assembly and defining openings for controlled flow of air into the region and for controlled flow of gas from the region, (c) the apparatus being characterized by the absence, between the upstream and downstream shroud means, of physical structure between the high velocity air stream and the region of relatively nonturbulent gas.

* * * * *